UNITED STATES PATENT OFFICE.

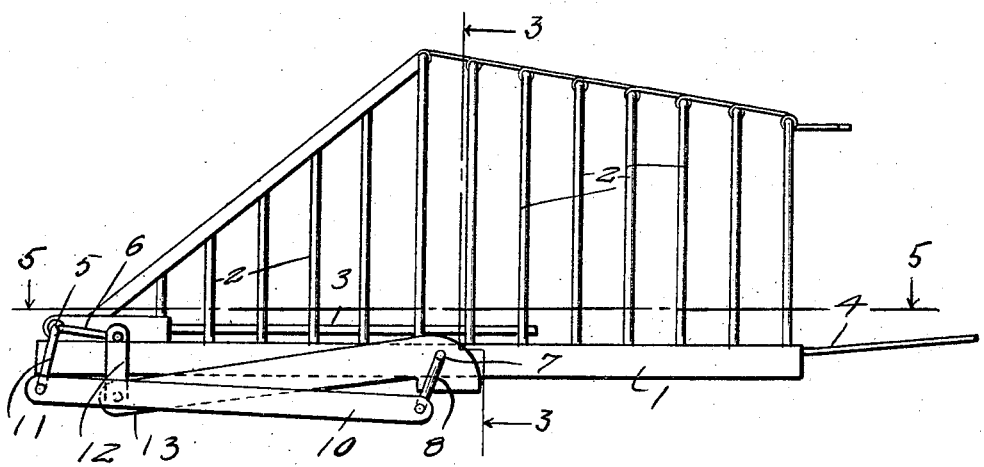
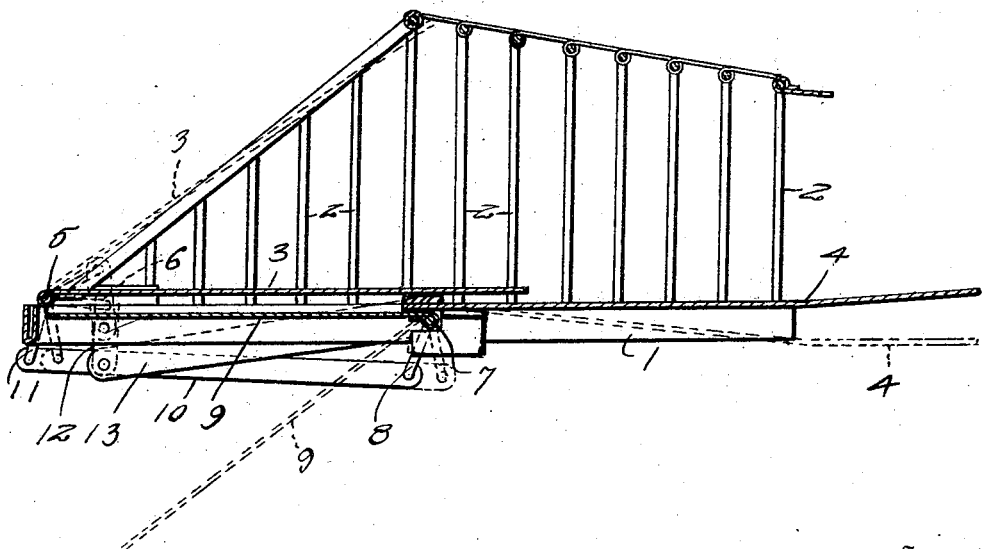

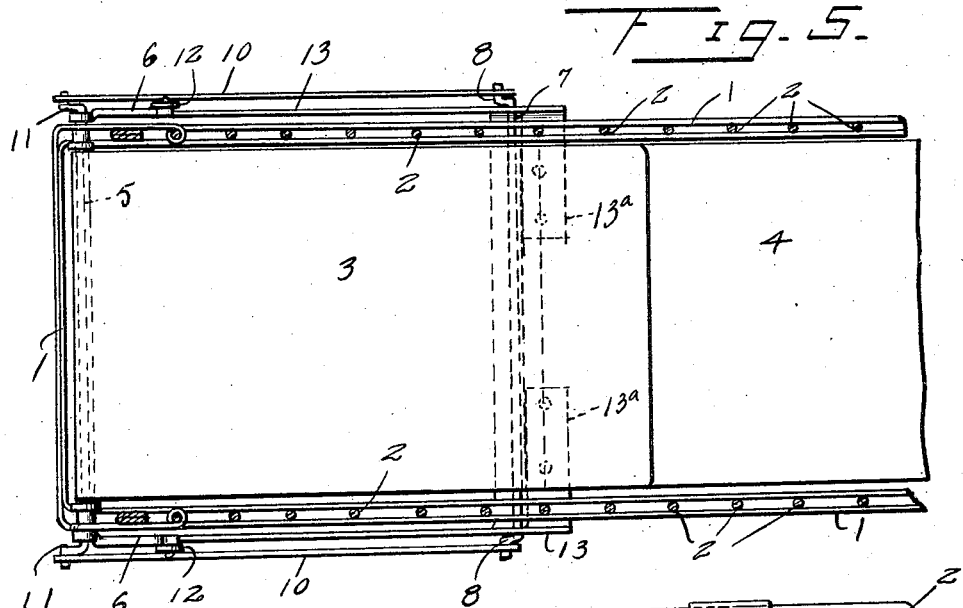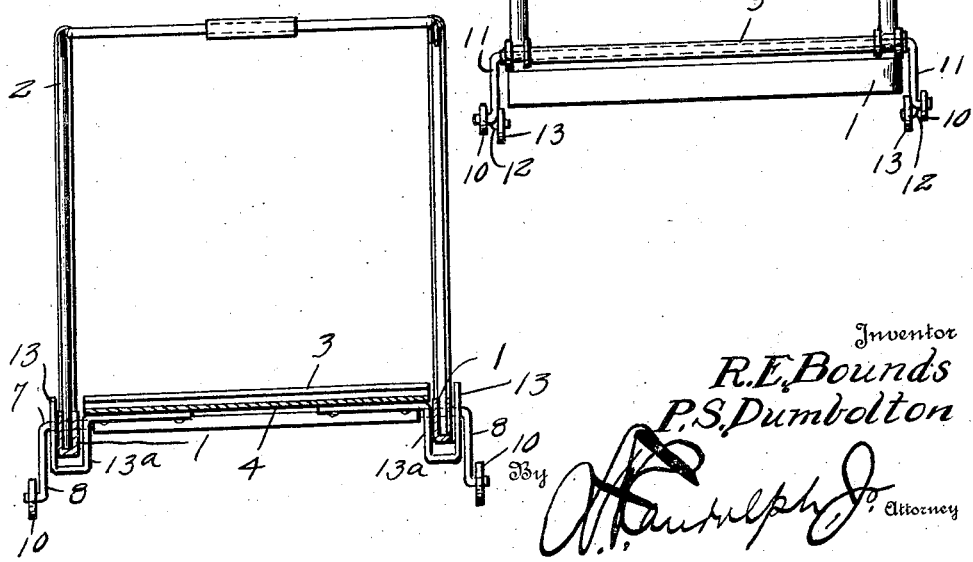

RUEL E. BOUNDS AND PERRY S. DUMBOLTON, OF WORTHAM, TEXAS.

SELF-SET ANIMAL TRAP.

1,415,301.  Specification of Letters Patent.  Patented May 9, 1922.

Application filed May 26, 1921. Serial No. 472,621.

*To all whom it may concern:*

Be it known that we, RUEL E. BOUNDS and PERRY S. DUMBOLTON, citizens of the United States, residing at Wortham, in the county of Freestone and State of Texas, have invented certain new and useful Improvements in a Self-Set Animal Trap; and we do hereby declare the following to be a full, clear, and exact description of the invention, such as will enable others skilled in the art to which it appertains to make and use the same.

This invention relates to traps of the type designed chiefly for domestic use for ridding dwellings of rodents and embodies an upper receiving section and a lower retaining section, and the two sections being separated by means of a trap door which is tripped by the animal and operates to precipitate the animal into the lower section or chamber, the trap door when relieved of the weight of the animal automatically returning to normal position.

Other objects and advantages will be apparent and suggest themselves as the nature of the invention is understood.

While the drawings illustrate an embodiment of the invention, it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a side view of the trap embodying the invention.

Figure 2 is a front end view thereof.

Figure 3 is a transverse section on the line 3—3 of Figure 1 looking to the right as designated by the arrows.

Figure 4 is a vertical central longitudinal section, the operation of the movable parts being indicated by dotted lines.

Figure 5 is a horizontal section on the line 5—5 of Figure 1.

Corresponding and like parts are referred to in the following description and designated in the several views of the drawings by like reference characters.

Inasmuch as the invention relates solely to the upper section and the parts associated therewith and may be applied to the lower section of any preferred type or construction it is shown disassociated from the lower or retaining section. The receiving section of the trap comprises a base frame 1 which preferably is approximately of U-form and comprises a sheet metal strip folded upon itself longitudinally and arranged with the open side uppermost to receive the lower ends of the legs or side members of approximately U-shaped frames 2. The frames 2 are spaced apart and progressively vary in length from an intermediate point toward opposite ends of the device. The body of the trap is closed at its top and sides and is open at its ends and bottom. Two doors 3 and 4 are provided for closing the bottom of the trap and are pivotally mounted at one end so as to tilt under the weight of the animal entering the trap. A transverse shaft 5 is disposed at one end of the trap and is provided at its ends with arms 6. The door 3 is secured at its outer end to the shaft 5 so as to turn therewith. The inner end of the door 4 underlaps the inner end of the door 3 and normally supports the latter. The outer end of the door 4 is adapted to swing downwardly whereas the inner end of the door 3 is adapted to swing upwardly. A transverse shaft 7 is located intermediate the ends of the base 1 and its projecting ends are provided with arms 8. A door 9 is located below the door 3 and is secured at its inner end to the shaft 7 and its outer end is adapted to swing downwardly in opposition to the upward movement of the door 3. Links 10 connect the lower end of the arms 8 with the lower ends of arms 11 connected with the transverse shaft 5. Links 12 connected with the outer ends of the arms 6 are connected by means of arms 13 with the door 4. The parts are so disposed whereby the door 9 acts as a counter balance to the doors 3 and 4 thereby insuring operation of the trap by an animal of comparatively light weight. When the weight of the animal is received upon the inner portion of the door 4 the same descends and by reason of the connections between the several doors, the door 3 swings upwardly at its inner end and the door 9 swings downwardly at its outer end. This results in the formation of a passage between the two doors 3 and 9 through which the animal may pass by reason of the downward tilting of the outer end of the door 4 and is received in the compartment or chamber arranged below the base 1 and as soon as the doors are free of the weight of the animal they return to normal position whereby the trap is automatically set for ensnaring the next animal entering the same.

The arms 13 are formed at their inner ends with brackets 13ᵃ which extend laterally inward and are secured to the door 4 and loosely embraces the side members of the frame 1. The arms 13 are pivotally mounted on the shaft 7. When the door 4 tilts downwardly at its outer end the arms 13 connected rigidly therewith move upwardly at their outer or forward ends, thereby swinging the arms 6 upwardly at their outer ends and rocking the shaft 5, whereby the doors 3 and 9 occupy the position indicated by dotted lines in Figure 4.

Having thus described the invention, what we claim is:—

1. A trap of the character specified comprising a body open at one end and bottom, pivoted doors closing the bottom of the trap and arranged the one to swing upwardly and the other downwardly, a third door pivoted at its inner end and adapted to swing downwardly at its outer end and disposed beneath the upwardly swinging door, and connecting means between the several doors, whereby the third door forms counter balancing means for the first two mentioned doors.

2. A trap comprising a body open at one end and bottom, end and intermediate transverse shafts each having arms at its outer ends, relatively upper and lower doors secured to the respective shafts, the upper door swinging upwardly at its inner end, and the lower door swinging downwardly at its outer end, a third pivoted door having its inner end underlapping the aforesaid upper door and connections between the several doors whereby the said lower door forms a counter balance for the other two doors and when in its operated position constitutes one wall of a passageway equipped to effect discharge of the animal therefrom.

In testimony whereof we affix our signatures in presence of two witnesses.

RUEL E. BOUNDS.
PERRY S. DUMBOLTON.

Witnesses.
MACK. C. STRANGE,
ROY R. KEELING.